Patented Jan. 15, 1929.

1,699,456

UNITED STATES PATENT OFFICE.

MINNIE B. TAYLOR, OF LOS ANGELES, CALIFORNIA.

VEGETABLE-SKINNING PROCESS.

No Drawing.  Application filed January 12, 1926.  Serial No. 80,712.

The invention is a means for readily removing the skin from vegetables or the like, in which the vegetables are placed in a boiling liquid containing a certain compound, and after a short time removed and placed into a cold liquid, after which the skin may be readily removed by hand.

The object of the invention is to provide a means for readily removing the skin of vegetables or the like.

Another object of the invention is to provide a compound which, when placed in boiling water will assist the water in rendering the skins of vegetables that may be placed therein, removable.

And a further object of the invention is to provide a hot liquid which will penetrate the skin of vegetables or the like that may be placed therein, so that as the vegetables are placed in a cold liquid to chill the outer surface of the skin, the skin may readily be removed.

The invention embodies a substance containing sodium chloride and sodium bicarbonate in equal proportions, the use of this substance in boiling water, and the placing of vegetables or the like into the boiling water for a predetermined time, removing them from the boiling water, placing them in cold water and then removing the skin of the vegetable.

In preparing the compound, I prefer to use the ingredients in the powder form and compress them into tablets.

In use, the tablets may be placed in boiling water and after it is thoroughly mixed and dissolved in the water, the condition of the water is such that when vegetables or the like are placed in it and permitted to remain in it for a short time, their skins may readily be removed after being cooled by a cold liquid.

Having thus fully described the invention, what I claim as new and desire to secure by Letters Patent, is:—

The method herein described of removing skin from vegetables, which consists of preparing a boiling solution of water and like amounts of sodium chloride and sodium bicarbonate, subjecting the vegetables to the action of this boiling solution for a predetermined length of time sufficient to cause the solution to penetrate the skin of the vegetables, then removing the vegetables and immediately introducing the same into cold water to chill the skin, and then removing the skin by hand friction.

In testimony whereof I hereby affix my signature.

MINNIE B. TAYLOR.